United States Patent
Fourcault et al.

(10) Patent No.: US 7,948,613 B2
(45) Date of Patent: May 24, 2011

(54) OPTICAL DEVICE FOR MEASURING MOVING SPEED OF AN OBJECT RELATIVE TO A SURFACE

(75) Inventors: William Fourcault, Grenoble (FR); Viviane Cattin, Saint Egreve (FR); Bernard Guilhamat, Saint Michel de Saint Geoirs (FR)

(73) Assignee: Commissariat a l'Energie Atomique (FR)

(*) Notice: Subject to any disclaimer, the term of this patent is extended or adjusted under 35 U.S.C. 154(b) by 271 days.

(21) Appl. No.: 12/089,400

(22) PCT Filed: Oct. 4, 2006

(86) PCT No.: PCT/EP2006/067021
§ 371 (c)(1),
(2), (4) Date: Oct. 14, 2008

(87) PCT Pub. No.: WO2007/042435
PCT Pub. Date: Apr. 19, 2007

(65) Prior Publication Data
US 2009/0213359 A1    Aug. 27, 2009

(30) Foreign Application Priority Data
Oct. 7, 2005    (FR) ...................................... 05 10281

(51) Int. Cl.
*G01P 3/36*    (2006.01)
(52) U.S. Cl. ............. 356/28; 356/28.5; 356/3.1; 356/5.1
(58) Field of Classification Search ........... 356/3.01–22, 356/28, 28.5
See application file for complete search history.

(56) References Cited

U.S. PATENT DOCUMENTS

| | | | |
|---|---|---|---|
| 4,794,384 A * | 12/1988 | Jackson | 345/166 |
| 6,741,335 B2 * | 5/2004 | Kinrot et al. | 356/28 |
| 2003/0034959 A1 | 2/2003 | Davis et al. | |
| 2003/0133097 A1 | 7/2003 | Yamaguchi et al. | |
| 2003/0142290 A1 | 7/2003 | Yamaguchi et al. | |
| 2004/0027577 A1 | 2/2004 | Sugiyama et al. | |
| 2004/0221790 A1 * | 11/2004 | Sinclair et al. | 116/62.1 |
| 2005/0094154 A1 * | 5/2005 | Baney et al. | 356/499 |

FOREIGN PATENT DOCUMENTS

| | | |
|---|---|---|
| DE | 10248416 A1 | 5/2004 |
| EP | 0562924 A | 9/1993 |
| FR | 2583882 A1 | 12/1986 |
| GB | 2221591 A1 | 2/1990 |
| JP | 02145972 A | 6/1990 |
| WO | 9853327 A1 | 11/1998 |

* cited by examiner

*Primary Examiner* — Thomas H Tarcza
*Assistant Examiner* — Luke D Ratcliffe
(74) *Attorney, Agent, or Firm* — Lowe Hauptman Ham & Berner, LLP

(57) ABSTRACT

The invention relates to sensors of the speed of movement of a vehicle over the ground. The sensor comprises illumination means for illuminating the surface and at least one optical sensor able to detect the radiation returned by the surface. The illumination means and the optical sensor have one and the same optical axis, oblique in relation to the surface. This arrangement eliminates the risks of specular reflection dazzling the sensor while avoiding disturbance of the measurement by variations in the height of the sensor relative to the ground.

11 Claims, 3 Drawing Sheets

OPTICAL DEVICE FOR MEASURING MOVING SPEED OF AN OBJECT RELATIVE TO A SURFACE

CROSS-REFERENCE TO RELATED APPLICATIONS

The present Application is based on International Application No. PCT/EP2006/067021, filed on Oct. 4, 2006, which in turn corresponds to French Application No. 05 10281 filed on Oct. 7, 2005, and priority is hereby claimed under 35 USC §119 based on these applications. Each of these applications are hereby incorporated by reference in their entirety into the present application.

FIELD OF INVENTION

The invention relates to a device for measuring the speed of relative movement of one object relative to another, and more precisely to a speed sensor for an object moving along a surface that is essentially planar (in any case locally planar) and optically textured (that is, nonuniform).

BACKGROUND OF THE INVENTION

The invention can be applied in various contexts, and will be explained first of all in connection with the context in which this sensor turns out to be particularly advantageous. This context is that of measuring the speed of a motor vehicle by optically observing the passing of the ground below the vehicle: the sensor is mounted under the vehicle.

Speed sensors for driving vehicles are most often based on measuring the speed of rotation of the wheels, but they are not very accurate because there is always uncertainty about the diameter of the wheels (depending on the wear and the level of inflation of the tires) and uncertainty about whether their rotation is without slippage: skidding and the lack of grip of the wheels are the cause of slippage that disturbs the measurement. In addition, these sensors are slow, since the speed is available only by integrating pulses and the pulses have a very low repetition rate when the vehicle is being driven slowly.

This is why it has already been proposed to attach optical sensors underneath the vehicle, which observe the ground moving relative to the vehicle and deduce from this the true speed of the vehicle. The ground always has a high-contrast optical texture on account of the roughness of the surfacing (tar, for example). A photosensitive element that observes a small area of the road illuminated by a light source will, if the vehicle moves forward, see the light flux varying as a function of this texture. By making successive measurements of correlation between portions of the signals received by two identical sensors offset longitudinally in the run direction of the vehicle and by thus observing the same portion of ground at different instants, it is possible to find an optimal correlation allowing the speed of the vehicle relative to the ground to be deduced if the distance between the sensors is known.

One simple solution consists in projecting a spot of light onto the surface of the road using a beam of light directed perpendicularly to the latter and in observing the light reflected or scattered in the direction of the source. A difficulty then occurs when the reflectance of the ground is too high: the sensor is dazzled by the specular reflection of the light on a plane reflecting surface and the observed image is unusable. This is the case notably when the road is wet: even if the specularly reflected intensity is only 3% of the intensity emitted by the source, this is still too much for the sensor, which must be able to detect very weak illuminations backscattered by ground that is not wet or the ground below the layer of water.

To solve this problem signal-processing-based solutions, on the one hand, have already been proposed, for example to eliminate that portion of the signal which is not coming from the observed ground texture but which is coming from the layer of water covering said texture. These solutions are not very effective due to the highly variable nature of the conditions observed.

The use of optical isolators has also been proposed, which, starting with the light polarization conditions (these being different for the specular reflection produced by the water and for the backscattering produced by the ground), allow the undesirable reflected light to be removed. These isolators (polarization splitters) generate very significant intensity losses in the signal so that they are difficult to use.

Another solution consists in tilting the direction of light emission relative to the surface of the ground. The receiver observes the ground via optics with their axes normal to the ground, but with the source illuminating the ground obliquely. If there is any water, the specularly reflected rays are also oblique and do not reach the receiver. Only the rays backscattered vertically by the ground are observed by the receiver. This technique of eliminating the specular reflection by tilting the axis of illumination relative to the axis of observation is similar to the technique of darkfield lighting used in microscopy.

However, it has been noted that this darkfield lighting technique is not satisfactory in the envisioned application of measuring the speed of movement of a vehicle relative to the ground. One drawback arises when the distance between the sensor and the ground is not constant. If the distance is too large or too small in relation to the theoretical distance where observation is optimal, then the spot of light produced by the source on an axis tilted to the ground is no longer beneath the receiver, and the receiver optics, having a relatively narrow receiver aperture, will no longer "see" the spot of light. Alternatively it is then necessary to enlarge greatly the size of the light spot and the subsequent correlation becomes much more difficult, and in addition the power of the light source must be enhanced accordingly. Consequently, this solution is not acceptable in contexts where the distance is not fixed. This is indeed what happens in the case of a vehicle on the ground.

European patent EP 0562924 describes such a solution: oblique illumination, normal observation.

Of course, the principle remains the same, with the same drawbacks, if the ground is illuminated normally while tilting the axis of observation of the receiver.

Means of analyzing the movement of an optical mouse of a computer, using an image sensor and a spatial correlation of successive images detected by the sensor as the mouse moves, have also been proposed in the prior art (US2003/0034959). Finding the direction of image shift is done by finding the best correlation among all the possible directions of movement.

SUMMARY OF THE INVENTION

The aim of the invention is to propose a device for measuring speed by optical means from the observation of a surface relative to which the object moves, this device being able to function precisely even if the distance between the device and the surface varies and even if the surface is covered with a transparent layer with a significant specular reflectivity. Specular reflectivity will here be considered significant even if it represents only a few percent.

According to the invention a device for measuring the speed of an object by optical means from the observation of images of a surface relative to which the object moves is proposed, which device comprises illumination means for illuminating the surface, at least one optical sensor able to detect the radiation returned by the surface and to provide images of the surface, and means for correlating these images, characterized in that the illumination means and the optical sensor have one and the same optical axis, oblique in relation to the surface, with sufficient obliquity for radiation emanating from the source and being specularly reflected off the surface not to be picked up by the sensor.

The optical sensor comprises an optical system allowing observation at a narrow aperture angle of an area of the surface illuminated by the spot of light formed by the illumination means. The angle of tilt relative to the normal is chosen to be sufficient for radiation emanating from the source and being specularly reflected off the surface not to be picked up by the optical sensor.

The measuring device can comprise two optical assemblies, each consisting of a light source providing a narrow beam of light along a determined axis that is oblique relative to the observed surface and an associated optical sensor to receive light backscattered by the surface. The sources have parallel optical axes and the optical axis of each sensor coincides with that of the source with which it is associated. The optical axes of the sensors are separated by a distance D and temporal correlation means are provided to determine the time delay that provides maximum correlation between the signals emanating from one sensor and the time-delayed signals of the other sensor.

To obtain a beam of light with an axis collinear with the axis of the optical sensor, a small mirror is preferably provided, placed at the center of one face of an input lens of the optical sensor, this mirror being illuminated by a beam of light arriving laterally relative to the axis, this beam of light being returned to the sensor axis by this mirror.

The light source may notably be a laser source or a light-emitting diode, possibly linked with beam shaping optics to give the spot of light formed on the ground the desired form and dimensions.

The optical sensor may also be able to provide two images, taken at two different instants, and the correlation means may be able to effect a spatial correlation between the images to determine the relative movement of the sensor between these two instants by determining the relative displacement of images that provides the best correlation between the displaced images.

The detector may be a matrix detector and consist of n×m detector elements, n and m being integers of which at least one is greater than 1, for a spatial correlation just as for a temporal correlation.

With a detector of n×m detector elements, n×m>1, at least a first and a second subset of detector elements can be defined that are able to provide a first and a second image of the surface, the correlation of these images being temporal, that is to say that the time delay between the images which maximizes the correlation is sought.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF DRAWINGS

The present invention is illustrated by way of example, and not by limitation, in the figures of the accompanying drawings, wherein elements having the same reference numeral designations represent like elements throughout and wherein.

DETAILED DESCRIPTION OF PREFERRED EMBODIMENTS

Figure 1:
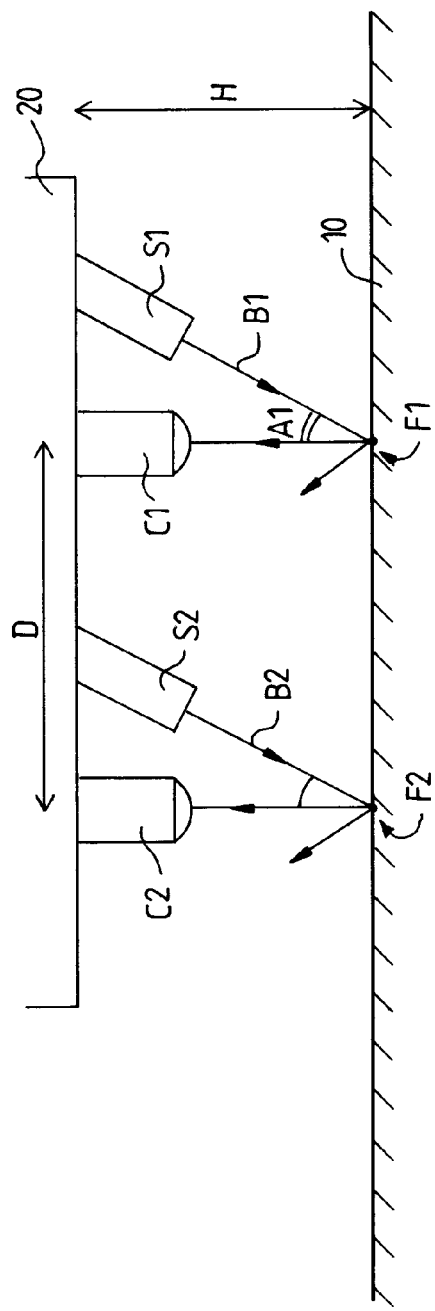
FIG. 1 shows the known principle for a sensor of the speed of movement of an object relative to a planar surface.

FIG. 1 recalls schematically the principle of measuring speed by optical observation of a surface 10 over which the object 20 is moving. The object 20 carries the measuring device which works by optically observing the passing of the surface 10. The principal application envisioned is that of measuring the speed of a vehicle running over the ground, and consequently the object 20 represents the chassis of the vehicle and the surface 10 represents the road, the measuring device being fixed underneath the chassis of the vehicle and turned downward to observe the road. It must be understood that the principle is the same if the object 20 is stationary, the surface 10 being in motion. For example, the surface might be a strip of fabric, a metal sheet etc., the run speed of which in relation to a stationary frame bearing the device for measuring the speed is intended to be measured. All that follows will talk principally of the surface of the ground 10, the object 20 being a running vehicle, but it will be understood that the invention is not limited to this application.

The measuring device consists of two optical assemblies separated by a distance D from each other. The first assembly comprises a light source S1 which directs a narrow beam of light B1 toward the ground to produce a small spot of light F1 on the ground. The direction of the axis of the beam B1 is not perpendicular to the surface 10. It is oblique and forms an angle of incidence A1 with the perpendicular to the ground. The first optical assembly also comprises an optical sensor placed just above the spot F1 which observes the spot in a direction perpendicular to the surface 10. The optical sensor comprises a photoelectric receiver (for example a photodiode or several photodiodes in the form of a linear array or a matrix) and an optical system focusing an image of the spot F1 onto the receiver. The optical system, made up of at least one focusing lens, has an optical axis perpendicular to the surface 10, therefore making an A1 with the axis of the beam B1 off the light source. The angle A1 is sufficiently large for the light emanating from a specular reflection of the beam B1 off the surface 10, in the case where this is partially reflecting, not to reach the optical sensor and therefore not, or practically not, to be projected onto the photoelectric receiver. It will be understood that the minimum value of the angle A1 depends on the aperture of the optical system of the sensor and also on the width of the beam B1.

For example, for an input lens of 25 mm diameter an angle A1 is chosen to be greater than at least 2° (for a distance of around 200 mm between the sensor and the surface). However, if the surface is not smooth, the angle A1 must be larger still so that no beam due to specular reflection (generated in a more open cone) reaches the sensor. In the preceding example, and if the surface has the roughness of a road pavement, the angle will be chosen to be around 10°.

In a simple example, the second optical assembly may be identical to the first and comprise a source S2 producing a narrow beam of light B2 and a spot F2 on the ground, and an optical sensor C2 with its axis perpendicular to the surface 10. The angle of incidence of the narrow beam B2 has the same value A1 as the angle of incidence of the beam B1.

The first sensor observes an image of the texture of the ground at an instant t, and if the object moves in the direction of an imaginary line separating the optical centers of the two sensors, the second sensor observes the same image at an instant t+dtm, where dtm is equal to D/V, where V is the speed of the vehicle and D the distance that separates the optical centers of the sensors.

The device comprises signal-processing circuits capable of making measurements of temporal correlation of a time sample of one of the signals with a time sample of the other signal, of the same duration but time-delayed by time intervals of dt0, dt1, dt2, etc. The signals are digitally sampled to carry out these correlation measurements.

The measurements of the various correlations are compared and the time interval for which the maximum correlation is observed is a value approaching the value dtm, from which the speed of the vehicle is calculated: V=D/dtm.

The signal-processing circuits are not shown in FIG. 1.

Figure 2:
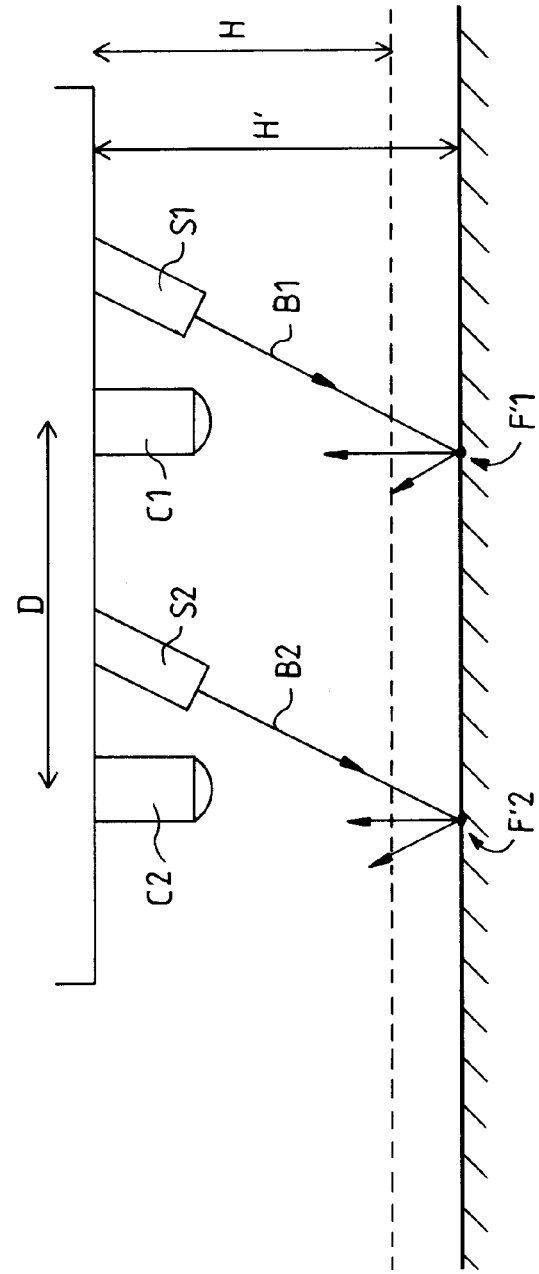
FIG. 2 shows the influence of modifying the distance between the device and the surface.

FIG. 2 shows the difficulty generated when the height between the chassis of the vehicle and the ground does not have the optimum value for which the optical axis of the optical sensors is exactly vertical to the spot of light F1 or F2. If the height becomes H', the spot F1 moves to a spot F'1 and the optical sensor starts to observe, along the vertical axis, a nonilluminated area which is difficult to analyze.

Figure 3:
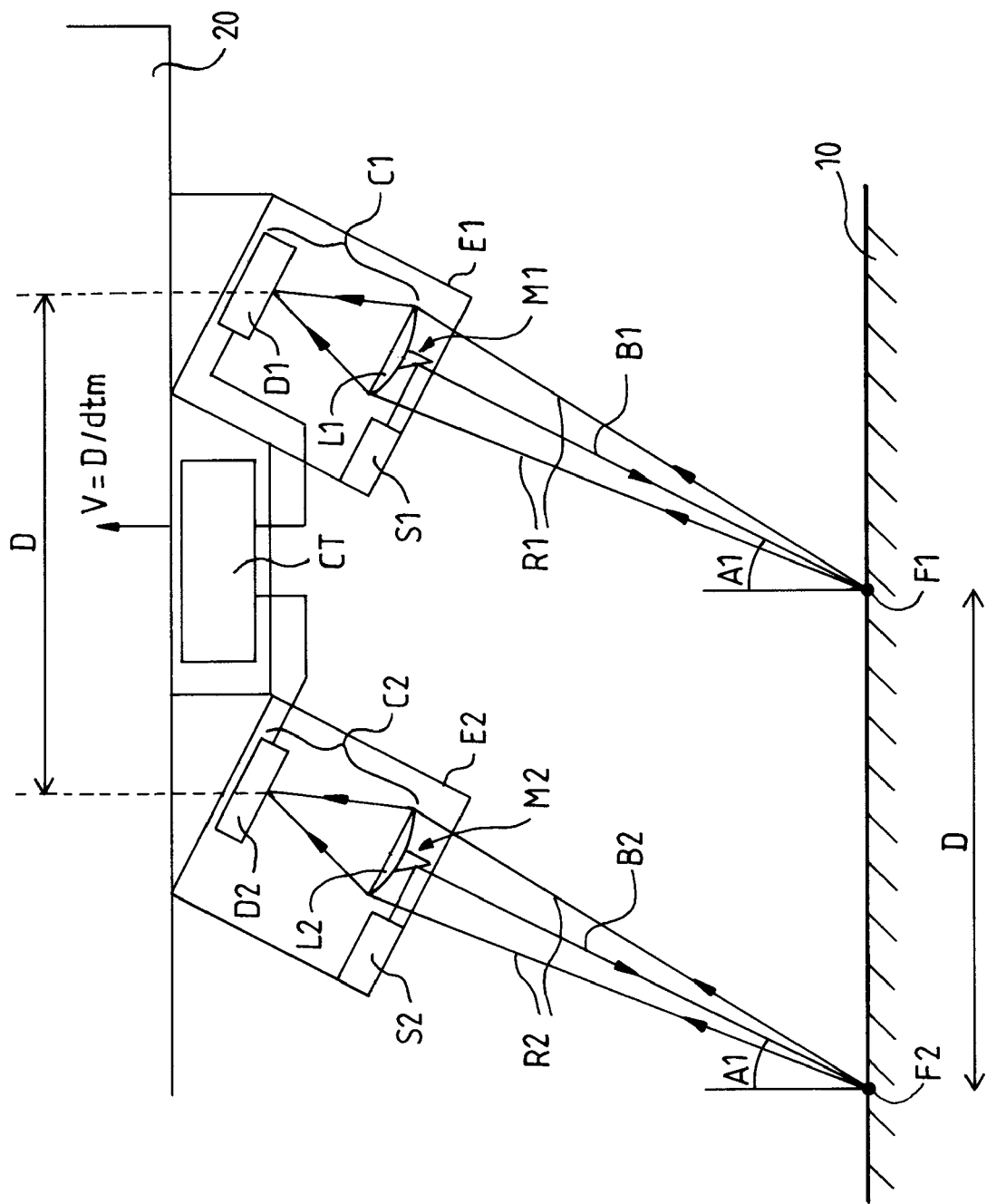
FIG. 3 shows the principle of the detection apparatus according to the invention.

FIG. 3 shows the principle of the measuring device according to the invention. The same references are used for the same elements as in FIG. 1.

There are again two optical assemblies E1 and E2. The light source S1 of the assembly E1 again produces a narrow beam B1 obliquely incident at an angle A1 relative to the normal to the ground, and this beam produces a narrow spot of light on the ground. The optical sensor C1 of the assembly E1 has an optical axis coincident with that of the beam B1. The light backscattered by the ground toward the optical sensor C1 is collected by the latter along this optical axis. It is shown in FIG. 3 by a broad beam R1.

The optical sensor is shown schematically here by a lens L1 and a photoelectric detector D1. The detector may comprise one or more detector elements (such as photodiodes) juxtaposed to define a linear array or a matrix.

To transmit an emitted beam B1 on the same axis as the receiver axis of the optical sensor C1, that is the optical axis of the lens L1, one solution is to position the source S1 laterally relative to the optical sensor and to place a small mirror M1 of low surface area at the center of the lens L1. This mirror must reflect the maximum amount of source light so as to send essentially all of it back toward the ground. On the other hand, the mirror must not eclipse a significant part of the lens, and this is why its size must be small compared with that of the lens, so that maximum backscattered light reaches the sensor. This is possible, notably, if the source S1 is a laser source. Beam shaping optics for the laser source, not shown, may be provided between the source and the mirror, notably a concave lens, to slightly enlarge the laser beam allowing the area of the spot of light F1 produced on the ground to be adjusted to a desired size. A diaphragm may also be added in the focal plane of the input lens L1 to improve the accuracy of the speed measurement.

FIG. 3 shows a second optical assembly E2 identical to the assembly E1 with a light source S2, a sensor C2 (lens L2, detector D2), a mirror M2 for returning the beam B2 of the source toward the ground (spot F2) with the same angle incidence as the beam B1.

The principle of electronic processing is the same as in FIG. 1: multiple correlations of signals with different time delays between the signals emanating from the two detectors and seeking the time delay dtm that provides the best correlation, then calculation of the horizontal speed by dividing the horizontal distance D separating the sensors by the optimal time delay dtm. The electronic processing is done in a processing circuit CT, which may be localized in the assembly E1 or E2 or close to these, or may even be part of an onboard computer also dedicated to other functions.

With the arrangement according to the invention not only is specular reflection eliminated when the road is wet (it suffices to choose a large enough angle A1), but there is no longer any trouble with risks of variation in height between the optical assemblies and the ground since, whatever the height is, the optical sensor always looks in the direction of the spot of light.

For example, an angle of tilt A1 of between 10° and 15° may be chosen, but this value is not critical provided it is the same for both optical assemblies. The higher the angle is, the more specular reflections are eliminated, but too high a value reduces the opportunities for correct observation of the ground.

In the foregoing, it was assumed that the optical assemblies are identical, that the spots F1 and F2 are point-like and that the detector linked with each optical assembly contains only a single detector element. In this case, it will be understood that a speed can be measured only in the direction that separates the first point-like spot F1 from the second point-like spot F2 are separated. Consequently, if there is a speed component perpendicular to this direction, the second spot F2 risks not illuminating a portion of the road previously illuminated by the first spot, and obtaining a correlation peak will be impossible. It is therefore preferable that one of the spots of light, for example the spot F2, is not point-like, but extends linearly on the ground perpendicular to the principal direction of movement of the vehicle. The detector D2 then comprises a linear detection array comprising multiple pixels aligned in the perpendicular direction, for example a hundred or so pixels spread over thirty millimeters or so. Each pixel is processed individually and correlated with the signal from the detector D1. The best correlation is sought among all the correlations carried out (with the various pixels of D2 and for each pixel of D2 with different time delays, as previously explained). The pixel of D2 and the time delay providing the best correlation are thus determined, which allows not only the speed value to be determined but also the direction of this speed, thus taking account not only of intentional variations in the direction of the vehicle, but also of slippage due to skidding.

Moreover, it may be noted that to refine the determination of the two speed components of the vehicle, it can be arranged for one of the sensors to have a linear array of multiple pixels aligned with the principal direction of movement of the vehicle (and the source to provide a beam that is flat and narrow in this direction) and the other sensor to have a linear array of multiple pixels aligned in the perpendicular direction (and the corresponding source to provide a beam that is flat and narrow in this perpendicular direction).

Figure 4:
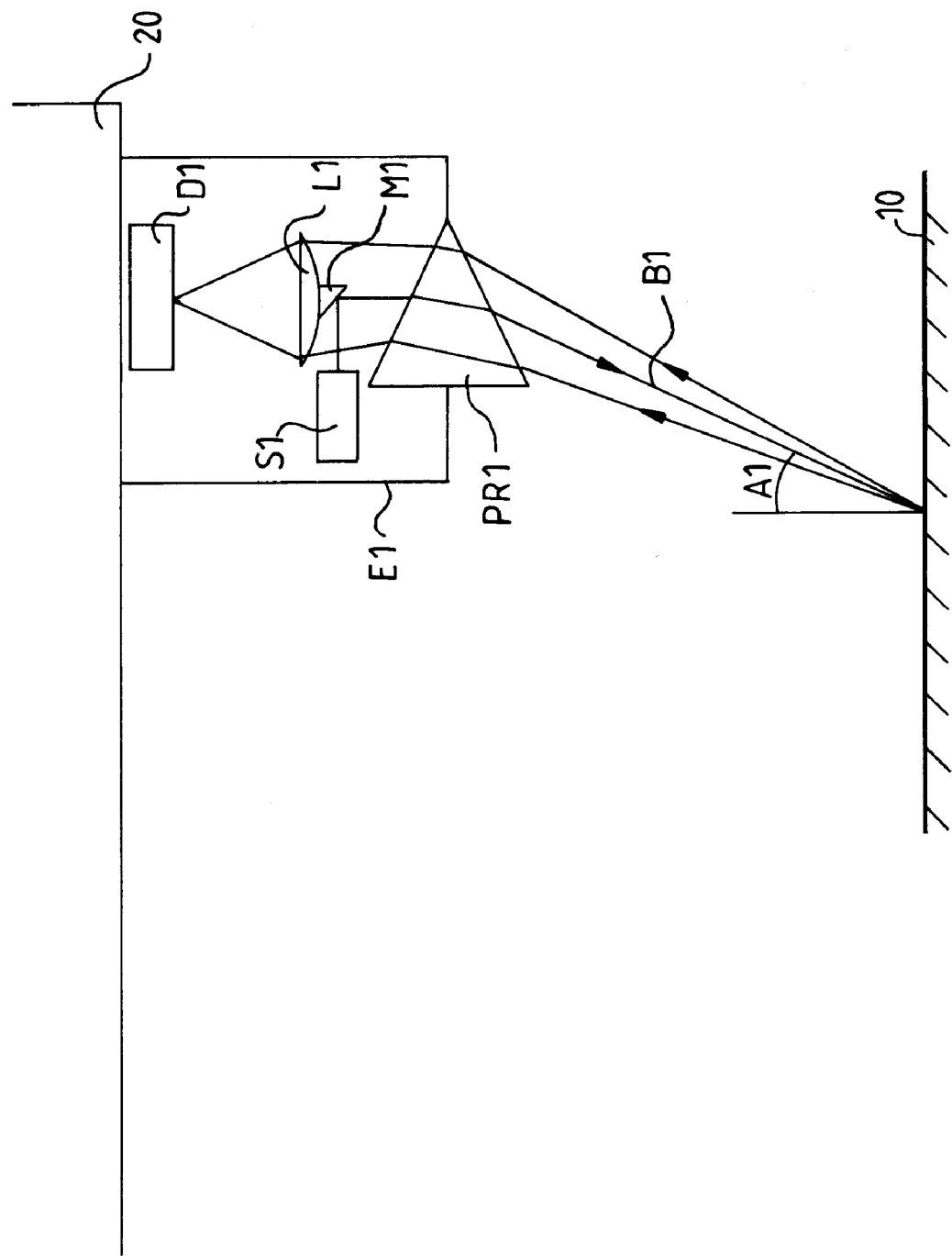
FIG. 4 shows a variant embodiment with an input-output prism.

In FIG. 3 it is assumed that the optical assemblies are mounted on the chassis with a fixing mechanism defining an angle A1 relative to the chassis in such a way that the optical axes of the sensors indeed have the desired angle of incidence relative to the ground. In FIG. 4 a slightly different possibility has been indicated: the optical axes of the actual sensors are vertical and a prism PR1 (for the assembly E1) deflects the beam by the angle A1. The concern here is with convenience of fitting into a vehicle, allowing the assemblies to be mounted vertically. In any case, the optical axis of transmission and reception between the vehicle and the ground has an oblique angle of incidence A1. The prism may be replaced by other optical elements (diffractive optics, for example) performing the same function.

In the interest of miniaturization or compactness, it may be advantageous to use only a single source (for example S2) and to do away with the other (S1). In this case, additional and specific optics must be used so that the beam emanating from S2 is able to pass partially through the mirror or prism M2, then, returning in various ways, to propagate as far as the mirror or prism M1, from where it is returned to the spot F1 producing the equivalent of a source S1.

Another way of miniaturizing the assembly is to use a matrix detector in which two subassemblies of detector elements are defined to act as the detectors D1 and D2. In this case, it is very advantageous to use only a single light source.

Finally, it may be advantageous to apply the invention to a spatial correlation system as proposed in the abovementioned prior art (in relation to the detection of movement of an optical mouse of a computer). In such a system successive images taken by the sensor at two different instants are observed, and the correlation between one of the images and the other, spatially offset image is calculated in various directions and with various amplitudes so as to determine which image displacement provides the best correlation between images. The speed is deduced from this displacement.

It will be readily seen by one of ordinary skill in the art that the present invention fulfils all of the objects set forth above. After reading the foregoing specification, one of ordinary skill in the art will be able to affect various, changes, substitutions of equilvants and various aspects of the invention as broadly disclosed herein. It is therefore intended that the protection granted hereon be limited only by definition contained in the appended claims and equivalents thereof.

The invention claimed is:

1. A device for measuring the speed of an object by optical means from the observation of images of a surface relative to which the object moves, the device comprising:
   illumination means for illuminating the surface, at least one optical sensor able to detect the radiation returned by the surface as images of the surface and means for correlating the images to determine a relative speed, wherein the illumination means and the at least one optical sensor have a common optical axis, oblique in relation to the surface, with an obliquity such that radiation emanating from the illumination means and specularly reflected by the surface is not captured by the at least one optical sensor.

2. The device as claimed in claim 1, wherein the at least one optical sensor is able to provide two images, taken at two different instants, and the means for correlation are able to effect a spatial correlation between the two images to determine the relative movement of the at least one optical sensor between the two different instants by determining the relative displacement of the two images that provides the best correlation between the displaced images.

3. The device as claimed in claim 2, wherein the at least one optical sensor is a matrix detector and consists of n×m detector elements, n and m being integers of which at least one is greater than 1.

4. The device as claimed in claim 1, wherein the at least one optical sensor comprises n×m detector elements, n and m being integers of which at least one is greater than 1, the at least one optical sensor being divided into at least a first and a second subset of detector elements able to provide a first and a second image of the surface, and the means for correlation are able to establish a temporal correlation between the first and second images.

5. The device as claimed in claim 1, wherein the illumination means comprises two distinct sources, the at least one optical sensor comprises two distinct detectors, each distinct source is associated with a respective detector, and in that the correlation of images provided by the distinct detectors is temporal.

6. The device as claimed in claim 5, wherein the two distinct sources have parallel optical axes.

7. The device as claimed in claim 1, wherein the at least one optical sensor comprises an input lens and a small mirror cemented at the center of the lens in order to return along the at least one optical sensor axis a beam arriving laterally relative to this axis.

8. The device as claimed in claim 7, wherein the input lens comprises a diaphragm in the focal plane of the lens.

9. The device as claimed in claim 1, wherein the illumination means is at least one of a laser source or a light-emitting diode.

10. The device as claimed in claim 9, wherein the illumination means is associated with beam shaping optics to give a spot of light formed on the ground a desired form and dimensions.

11. The device as claimed in claim 1, adapted to be mounted on a vehicle for detection of speed of a vehicle moving over the ground.

* * * * *